April 25, 1967   B. V. KELLNER   3,315,668
CATTLE HORN TRAINING DEVICE
Filed Oct. 20, 1965
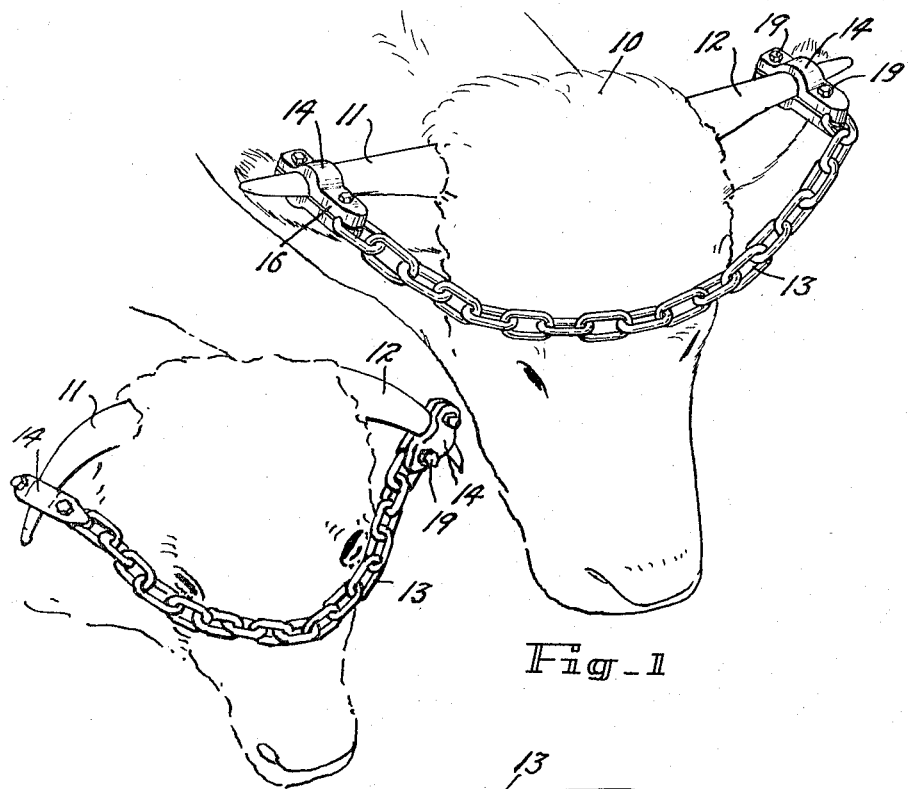
Fig_1
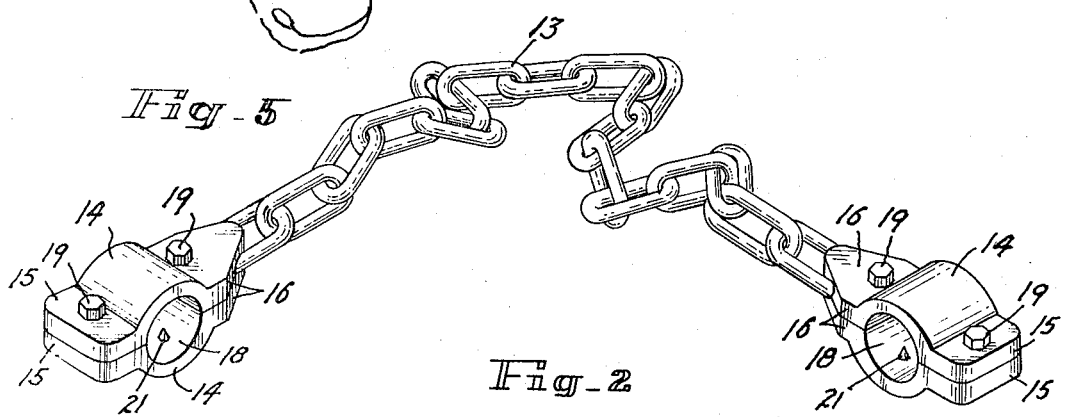
Fig_2
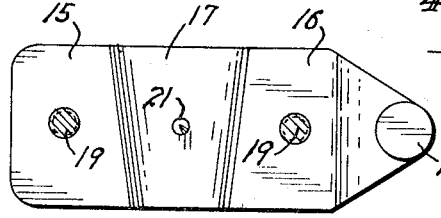
Fig_4
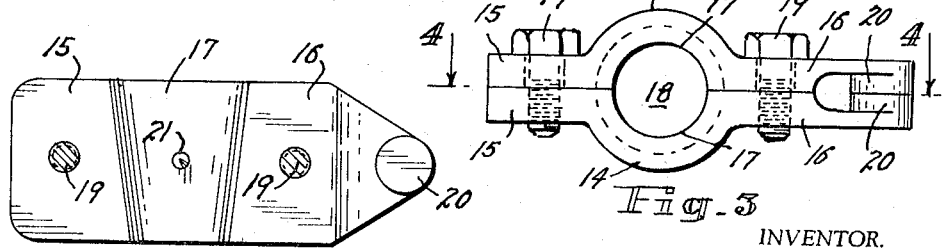
Fig_3
INVENTOR.
BLUFORD V. KELLNER
BY
ATTORNEY 3,315,668
CATTLE HORN TRAINING DEVICE
Bluford V. Kellner, Kanorado, Kans. 67741
Filed Oct. 20, 1965, Ser. No. 498,266
1 Claim. (Cl. 128—76)

This invention relates to a horn trainer for cattle. As a protection from herd damage, it is customary in the cattle industry to dehorn the dairy and beef calves and to train the horns of bull calves forwardly and downwardly for show purposes and to prevent injury to other animals.

The principal object of this invention is to provide an exceedingly simple, easily applied device which will simultaneously and uniformly apply weight to both the horns of a calf so as to tend to cause the horns to uniformly grow downwardly and forwardly.

Another object is to construct the device so as to eliminate all springs and individual horn weights and to provide a device in which a single gravity source will be continuously and uniformly applied to both horns simultaneously without damage or injury.

It is customary to restrain an animal for the administration of various therapeutic treatments by gripping the two horns in the two hands. A further object of this invention is to provide a horn training device which will enable the animal to be restrained by a single hand leaving the other hand free for administrative purposes.

Other objects and advantages reside in the detail construction of the invention, which is designed for simplicity, economy, and efficiency. These will become more apparent from the following description.

In the following detailed description of the invention, reference is made to the accompanying drawing which forms a part hereof. Like numerals refer to like parts in all views of the drawing and throughout the description.

In the drawing:

FIG. 1 is a perspective view showing the training device as it would appear on an animal at the start of the training period;

FIG. 2 is an enlarged perspective view of the device as it would appear removed from the animal;

FIG. 3 is a still further enlarged, detail side view of a horn clamp as used in the invention;

FIG. 4 is a horizontal, sectional view of the horn clamp taken on the line 4—4, FIG. 3; and FIG. 5 is a perspective view showing the position attained by the device at the completion of the training period.

On the drawing, the horns of an animal 10 are designated by the numerals 11 and 12.

The device is comparatively simple and consists of a length of relatively heavy, open-link chain 13 terminating at each of its extremities in a horn clamp.

Each horn clamp comprises two clamping elements preferably formed of cast aluminum. The clamping elements are similar but of opposite hand and each is provided with a medially positioned semi-cylindrical portion 14 from which two side flaps 15 and 16 oppositely protrude. The semi-cylindrical portion of each element contains a tapered, internal, horn-gripping groove 17 to form, when assembled, a horn passage 18 having a taper approximating the natural taper of an animal horn. It is preferred to form a relatively sharp protuberance 21 in the grooves 17 to engage the horn and retain the clamps in place thereon.

The clamping elements are secured together in pairs by means of clamp screws 19 which pass through the flaps of the upper elements and are threaded into the flaps of the lower elements, as shown in FIG. 3, to clamp the elements upon opposite sides of an animal's horn.

The side flap 16 of each clamping element extends outwardly and is provided with a protruding chain-attachment lug 20 which, when the elements are clamped together will contact each other, as shown in FIG. 6, to pivotally retain a terminal link of the chain 13 in pivotal relation to the lugs 20.

In actual practise, chains consisting of seventeen links and having a length of 21 inches and a weight of 2½ pounds have been found to be highly satisfactory for use on the average animal and have been found to satisfactorily train the horns of a calf in a period of from 6 weeks to four months.

It will be noted that the training is accomplished solely by the weight of the suspended chain and that this weight is uniformly distributed to both horns. There is no tendency, other than gravity, to draw the horns together.

While the invention is primarily designed to train the direction of the horns, the chain also serves as a convenient grip for the hand while restraining the animal for various treatments.

While a specific form of the invention has been described and illustrated herein, it is to be understood that the same may be varied within the scope of the appended claim, without departing from the spirit of the invention.

Having thus described the invention, what is claimed and desired to be secured by Letters Patent is:

A cattle horn training device comprising:
(a) a freely flexible open link chain of sufficient length to extend between the horns and depend forwardly of the face of an animal;
(b) a pair of clamping elements mounted on the terminal link at each extremity of said chain;
(c) means for clamping the elements of each pair of clamping elements toward each other against opposite sides of an animal's horn;
(d) a side flap extending outwardly from each of said elements; and
(e) a lug formed on each of said side flaps, the lugs of each pair of clamping elements being aligned with and facing each other so that when the elements of each pair of clamping elements are clamped together the lugs of that pair will be similarly clamped together in a terminal link of said chain to lock said pair thereon, said chain being relatively heavy to tend to cause the horns to which said pairs are attached to uniformly grow downwardly and forwardly.

References Cited by the Examiner

UNITED STATES PATENTS

| | | | |
|---|---|---|---|
| 1,552,494 | 9/1925 | Mock | 128—76 |
| 2,541,226 | 2/1951 | Ellis | 128—76 |

FOREIGN PATENTS 661,615  11/1951  Great Britain.

SAMUEL KOREN, *Primary Examiner.*

HUGH R. CHAMBLEE, *Examiner.*